No. 842,933. PATENTED FEB. 5, 1907.
W. O. BEMENT.
HOOK.
APPLICATION FILED JAN. 2, 1902.

Witnesses
Roy D. Tolman.
Penelope Comberbach.

Inventor
William O. Bement.
By Rufus B. Fowler
Attorney

UNITED STATES PATENT OFFICE.

WILLIAM O. BEMENT, OF WORCESTER, MASSACHUSETTS, ASSIGNOR TO THE WIRE GOODS COMPANY, OF WORCESTER, MASSACHUSETTS, A CORPORATION OF MASSACHUSETTS.

HOOK.

No. 842,933.      Specification of Letters Patent.      Patented Feb. 5, 1907.

Application filed January 2, 1902. Serial No. 88,115.

*To all whom it may concern:*

Be it known that I, WILLIAM O. BEMENT, a citizen of the United States, residing at Worcester, in the county of Worcester and Commonwealth of Massachusetts, have invented a new and useful Improvement in a Hook, of which the following is a specification, accompanied by drawings forming a part of the same, in which—

Figure 1:
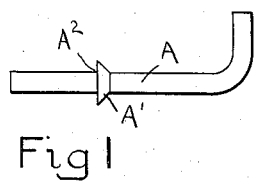
Figure 2:
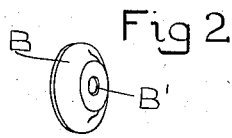
Figure 3:
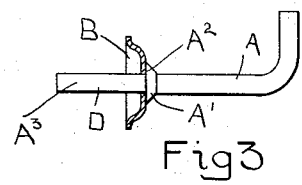
Figure 4:
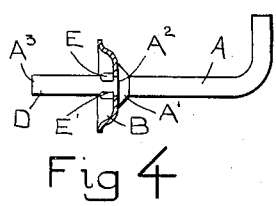
Figure 6:
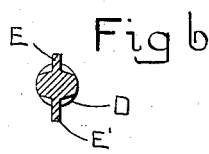
Figure 5:
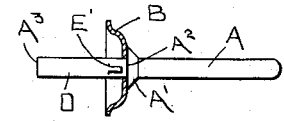
Figure 7:
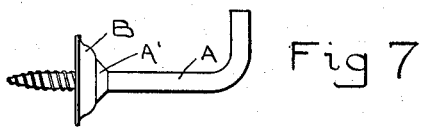

Figure 1 represents a piece of wire bent to form a hook and having a raised collar provided with an abutting shoulder to receive a washer and hold it from longitudinal movement on the hook. Fig. 2 represents the washer detached from the hook. Fig. 3 represents a hook similar to that shown in Fig. 1, but with the washer applied thereto. Fig. 4 represents the hook in side view after the retaining wings or spurs have been formed, the washer being shown in sectional view. Fig. 5 is a similar view to that thown in Fig. 8, but with the hook turned one-quarter turn. Fig. 6 is a transverse sectional view through the body of the hook on the plane of the projecting wings E E', and Fig. 7 represents the completed hook with the end or tip designed to enter the woodwork pointed and provided with a screw-thread.

Similar reference letters and figures refer to similar parts in the different views.

The object of my present invention is to produce a screw or drive hook provided with a screw-threaded tip by which it is attached to the woodwork and having a cup-shaped washer adapted to be drawn against the woodwork by the insertion of the hook therein, said washer being held from longitudinal movement on the hook by the abutting shoulder of a raised collar integral with the body of the hook and adapted to resist the pressure of the washer against the woodwork and having projecting wings or spurs integral with the body of the hook and bearing against the opposite side of the cup-shaped washer to prevent its accidental removal from the hook, as hereinafter described, and pointed out in the annexed claims.

Screw or drive hooks are now in common use provided with a raised collar integral with the body of the hook and provided with an abutting shoulder and having a washer loosely applied to the body of the hook, as shown in Fig. 3 of the drawings. In hooks of this construction, however, with the washers loosely applied to the body of the hook the hook and washer are liable to be separated and the washer lost. In my improved hook I obviate this difficulty by forming, preferably on diametrically opposite sides, projecting spurs or wings integral with the body of the hook and bearing against the front or concave side of the washer, by which the washer is held in contact with the raised collar and firmly held upon the body of the hook, and I accomplish this result by the process hereinafter described.

Referring to the drawings, Fig. 1 represents what I term a "hook-blank," consisting of a plain piece of wire A, bent at one end to form a suitably-shaped hook and provided a short distance from its opposite end with a raised collar A', having on one side an abutting shoulder $A^2$ at right angles with the axis of the hook. A cup-shaped washer B, Fig. 2, is then stamped from sheet metal, having a hole B' to enable the washer to be applied to the hook and bear against the shoulder $A^2$, as represented in Fig. 3. I next compress the body of the hook in front of or on the concave side of the washer B between a pair of reciprocating dies, said dies being so shaped and so arranged that the metal of the hook immediately in front of or on the concave side of the washer B is pressed laterally outward to form on diametrically opposite sides of the hook projecting spurs or wings E E', which bear against the front or concave side of the washer B, thereby preventing the removal of the washer from the body of the hook, as shown in Figs. 8, 9, and 10.

I do not confine myself to wings or spurs of the shape shown for the purpose of retaining the washer against the collar A', as the number and shape of the wings can obviously be varied and produce the same result. The purpose of my invention is secured by the employment of a radially-projecting mass of metal integral with the body of the hook by which the washer is held from sliding off the end or tip D of the hook, with said projecting mass of metal forming wings or spurs inclosed within the concave side of the washer, whereby the edge of the washer is brought into contact with the woodwork and the hook permitted to turn within the washer as the hook is screwed into the woodwork. While the difficulty of the facile detachability and consequent liability to loss of the washer from the body of the hook might be obviated by firmly fastening said washer to the hook, this would give rise to the disadvantage that the washer would then turn with the hook and mark and otherwise mar the surface of the woodwork into which the hook was inserted. In my hook, however, the washer, while held from longitudinal movement toward either end of the hook, is nevertheless independent of it and allows the body of the hook to rotate freely without revolving the washer.

What I claim as my invention, and desire to secure by Letters Patent, is—

1. As an article of manufacture, a hook provided with a shoulder, a cup-shaped washer held on said hook with its convex side bearing against said shoulder, and a spur radially projecting from the side of said hook and inclosed within the concave side of said washer.

2. As an article of manufacture, a hook consisting of a single piece of wire provided with a screw-threaded tip at one end and a hooked section at the opposite end, a raised shoulder between the tip and the hooked section, a concaved washer held on the wire with its convex side against said shoulder, and a pair of radially-projecting spurs integral with the wire and inclosed within the concave side of said washer.

Dated this 31st day of December, 1901.

WILLIAM O. BEMENT.

Witnesses:
M. M. SCHUERMANN,
RUFUS B. FOWLER.